(12) United States Patent
Horng et al.

(10) Patent No.: US 6,336,745 B1
(45) Date of Patent: Jan. 8, 2002

(54) OIL-IMPREGNATED BEARING AND ROTOR SHAFT COMBINATION

(75) Inventors: Alex Horng; Yin Rong Hong, both of Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/563,955

(22) Filed: May 2, 2000

(30) Foreign Application Priority Data

Dec. 13, 1999 (TW) ........................................ 88221329 U

(51) Int. Cl.$^7$ .............................................. F16C 33/10
(52) U.S. Cl. ...................... 384/279; 384/107; 384/130; 384/295
(58) Field of Search ................................ 384/100, 107, 384/111, 113–115, 118, 119, 130, 226–228, 243, 244, 246, 276, 279, 295, 322, 397, 415, 428, 902; 310/90

(56) References Cited

U.S. PATENT DOCUMENTS

| | | | | |
|---|---|---|---|---|
| 4,737,673 A | * | 4/1988 | Wrobel ................... 384/295 X |
| 5,281,035 A | * | 1/1994 | Lo .............................. 384/279 |
| 5,610,462 A | * | 3/1997 | Takahashi .................... 310/90 |
| 5,833,370 A | * | 11/1998 | Ikeda et al. ............. 384/279 X |
| 5,941,646 A | * | 8/1999 | Mori et al. ................. 384/279 |

FOREIGN PATENT DOCUMENTS

JP          01083914 A  *  3/1989  ................. 384/130

* cited by examiner

*Primary Examiner*—Thomas R. Hannon
(74) *Attorney, Agent, or Firm*—Bacon & Thomas, PLLC

(57) ABSTRACT

An oil-impregnated bearing and rotor shaft combination includes an oil-impregnated bearing with a central hole for pivotally holding a rotor shaft. The oil-impregnated bearing is mounted in a hole of an axle tube in a slip-fit manner. Each of two ends of the hole of the axle tube is sealed by a cap by means of tight engagement to thereby restrain the oil-impregnated bearing in the hole of the axle tube and between the caps. The rotor shaft is extended through an opening in the upper one of the caps and through the central hole of the oil-impregnated bearing with a lower end of the rotor shaft pivotally supported by an inner side of the lower one of the caps.

8 Claims, 2 Drawing Sheets

OIL-IMPREGNATED BEARING AND ROTOR SHAFT COMBINATION

BACKGROUND OF THE INVENTION

1. Field of the Invention

The present invention relates to an oil-impregnated bearing and rotor shaft combination that includes an oil-impregnated bearing mounted in an axle tube in a slip-fit manner for pivotally holding the rotor shaft and for preventing leakage of lubrication oil.

2. Description of the Related Art

A typical conventional heat-dissipating fan or brushless motor includes a rotor having a shaft pivotally held by a bearing. Commonly used bearings include ball bearings or oil-impregnated bearings (self-lubricating bearings). An oil-impregnated bearing is generally tightly secured to an inner periphery of an axle tube or bearing seat for pivotally holding the rotor shaft. It is, however, found that the oil-impregnated bearing is compressed in the radial direction and thus results in deformation in an inner periphery of a hole in the oil-impregnated bearing. As a result, non-smooth friction occurs between the rotor shaft and the inner periphery defining the hole of the oil-impregnated bearing. Although such deformation is relatively small, rotational noise tends to occur under continuous operation of the rotor shaft at high speed. In addition, a gap between the rotor shaft and the inner periphery defining the hole of the oil-impregnated bearing becomes larger due to continuous non-smooth friction. Vibrations occur during rotation of the rotor shaft and greater noise is generated. The operating life of the bearing is accordingly shortened.

U.S. Pat. No. 5,610,462 to Takahashi issued on Mar. 11, 1997 discloses a brushless motor in which an oil-impregnated sleeve bearing is inserted in a bearing holder having a cylindrical shape with a closed bottom, and a rotating shaft is inserted in the oil-impregnated sleeve bearing in such a manner that the rotating shaft may freely rotate. Nevertheless, some of the elements are difficult to manufacture, such as the boss 58 and the cut-away portions 46 d1 of the rotor, as the boss and the cut-away portions must mate with each other precisely in order to prevent oil leakage and to provide easy assembly procedure.

SUMMARY OF THE INVENTION

It is a primary object of the present invention to provide an oil-impregnated bearing and rotor shaft combination in which the elements can be manufactured and obtained easily and leakage of lubrication oil is prevented and rotational noise is reduced.

It is another object of the present invention to provide an oil-impregnated bearing and rotor shaft combination in which the oil-impregnated bearing mounted in an axle tube in a slip-fit manner for avoiding deformation of an inner periphery of the hole of the oil-impregnated bearing and for pivotally holding the rotor shaft in a smooth maimer.

It is a further object of the present invention to provide an oil-impregnated bearing and rotor shaft combination that may prevent leakage of lubrication oil and lengthen operating life of the bearing.

In accordance with the present invention, an upper cap is tightly and securely mounted to an upper end of the axle tube. After a shaft of a rotor is extended through an opening in the upper cap, a retainer, e.g., a retainer ring, is provided to retain the rotor shaft in place. An oil-impregnated bearing is mounted around the rotor shaft in a slip-fit manner in a position below the retainer. A lower cap seals the lower end of the axle tube for pivotally supporting the rotor shaft and the oil-impregnated bearing is restrained between the upper and lower caps.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

The present invention will be described below with reference to the accompanying drawings.

Figure 1:
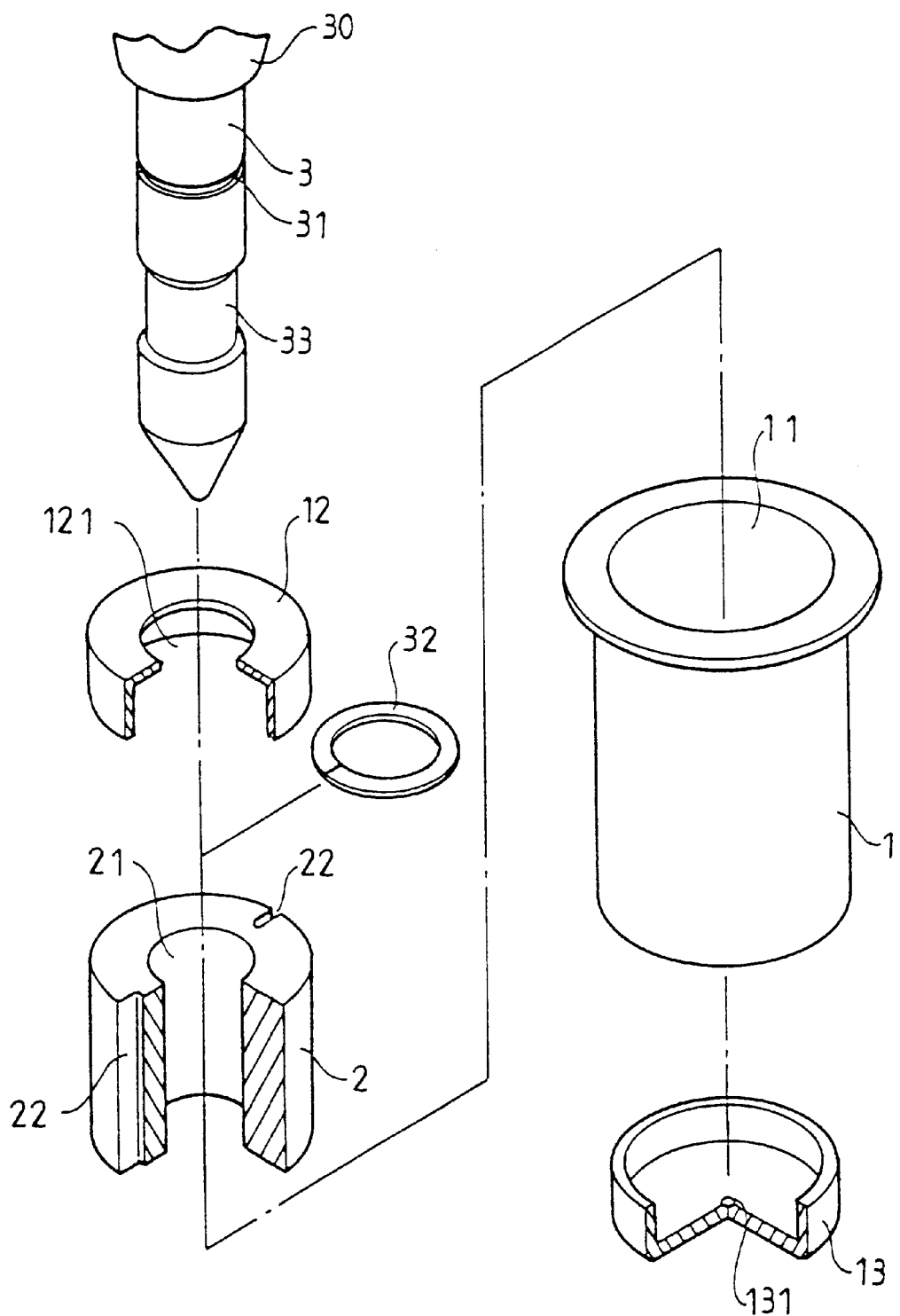
FIG. 1 is an exploded perspective view, partly cutaway, of a first embodiment of an oil-impregnated bearing and rotor shaft combination in accordance with the present invention.

Referring to FIG. 1, a first embodiment of an oil-impregnated bearing and rotor shaft combination in accordance with the present invention generally includes an axle tube 1, an oil-impregnated bearing 2, and a rotor shaft 3.

The axle tube 1 is made of metal or integrally formed with a bearing seat of a housing. The axle tube 1 includes a hole 11 in which the oil-impregnated bearing 2 is mounted in a slip-fit manner. After the oil-impregnated bearing 2 is mounted in the hole 11 of the axle tube 1, an upper cap 12 is mounted to tightly seal an upper end of the axle tube 1. The upper cap 12 has an opening 121 through which the rotor shaft 3 is extended. A lower cap 13 is mounted to tightly seal a lower end of the axle tube 1. The oil-impregnated bearing 2 is restrained (securely sandwiched) between the upper cap 12 and the lower cap 13. A lower end of the rotor shaft 3 is supported by an inner side of the lower cap 13. In order to provide a stable support for the rotor shaft 3, the inner side of the lower cap 13 may include a depression 131 for pivotally supporting the rotor shaft 3.

The oil-impregnated bearing 2 may be a known copper bearing, self-lubricating bearing, or a bearing containing lubricating oil therein. The oil-impregnated bearing 2 is mounted in the hole 11 of the axle tube 1 and includes a central hole 21 for pivotally holding the rotor shaft 3. In addition, the oil-impregnated bearing 2 includes at least one longitudinal channel 22 defined in an outer periphery thereof. The longitudinal channel 22 extends over the entire longitudinal length of the oil-impregnated bearing 2 to provide a circulating path for the lubricating oil.

Figure 2:
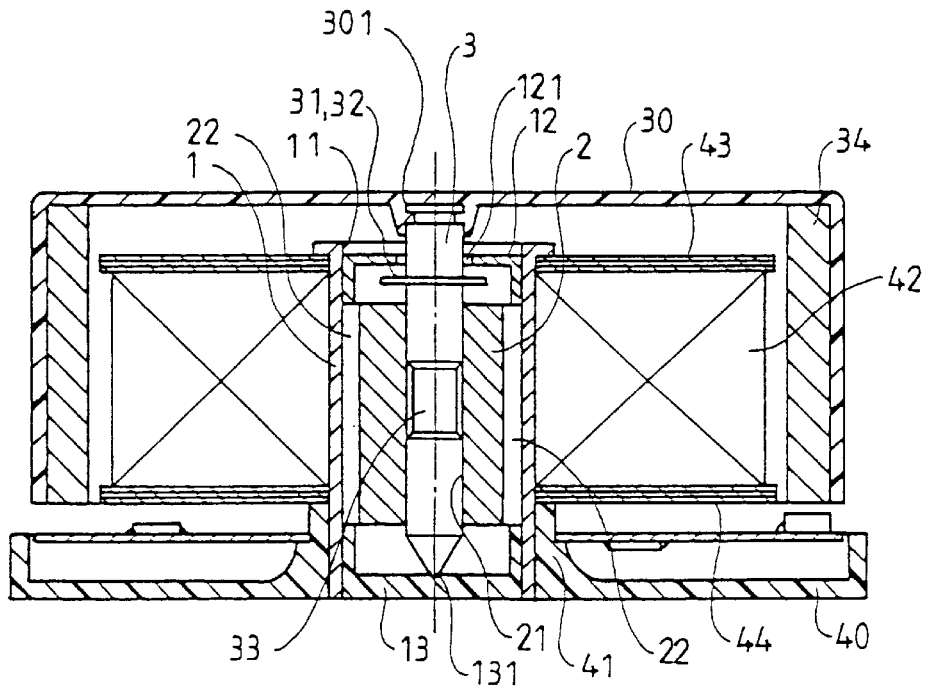
FIG. 2 is a sectional view of a miniature motor with the first embodiment of the oil-impregnated bearing and rotor shaft combination in accordance with the present invention.

The rotor shaft 3 has an upper end securely connected to a center of a rotor 30 (FIG. 2). The rotor shaft 3 is extended through the opening 121 of the upper cap 12 and the central hole 21 of the oil-impregnated bearing 2 with the lower end of the rotor shaft 3 pivotally supported by the inner side of the lower cap 13, as mentioned above. After the rotor shaft 3 is extended through the opening 121 of the upper cap 12, a retainer 32 (e.g., a retainer ring) is engaged in a retaining groove 31 of the rotor shaft 3 to thereby prevent the rotor shaft 3 from coming off the axle tube 1, as the retainer 32 has an outer diameter greater than an inner diameter of the opening 121 of the upper cap 12. The retainer 32 is preferably located adjacent to the opening 121 of the upper cap 12 to prevent oil leakage via the opening 121. In order to reduce contact area between the rotor shaft 3 and the oil-impregnated bearing 2, the rotor shaft 3 includes at least one annular groove 33 that may also be used for storing lubrication oil. The lower end of the rotor shaft 3 may be conic-shaped so as to be pivotally received in the depression 131 of the lower cap 13. Thus, the rotor shaft 3 may rotate in a stable and smooth manner.

Referring to FIG. 2, in the first embodiment of the invention, the axle tube 1 is fixed on a bearing seat 41 of a housing 40. A stator coil 42 and upper and lower pole plates 43 and 44 are mounted around the axle tube 1. Upper end of the rotor shaft 3 is securely connected to the center of a rotor 30. A ring magnet 34 provides induction with the stator coil 42 for driving the rotor 30 to rotate. The rotor shaft 3 is extended through the opening 121 of the upper cap 12 and retained in place by the retainer 32 to thereby prevent the rotor shaft 3 from coming off the axle tube 1. The retainer 32 also seals the opening 121 of the upper cap 12 and thus prevents oil leakage via the opening 121.

In assembly, the upper cap 12 is tightly engaged in the hole 11 of the axle tube 1. The rotor shaft 3 is then extended through the opening 121 of the upper cap 12 and the retainer 32 is engaged in the retaining groove 31 of the rotor shaft 3 to thereby retain the rotor shaft 3 in place. Next, the oil-impregnated bearing 2 is inserted into the axle tube 1 from the other end (lower end) of the axle tube 1 in a slip-fit manner. The term "slip-fit" used herein means engagement of the oil-impregnated bearing 2 into the hole 11 of the axle tube 1 is achieved without force-fitting of the oil-impregnated bearing 2. The central hole 21 of the oil-impregnated bearing 2 receives and holds the rotor shaft 3. The lower cap 13 is tightly mounted into the lower end of the hole 11 of the axle tube 1. The rotor shaft 3 is pushed upward during mounting of the lower cap 13 into the axle tube I such that the shaft seat 301 of the rotor 30 does not contact with the upper cap 12 to assure smooth rotation of the rotor 30.

Figure 3:
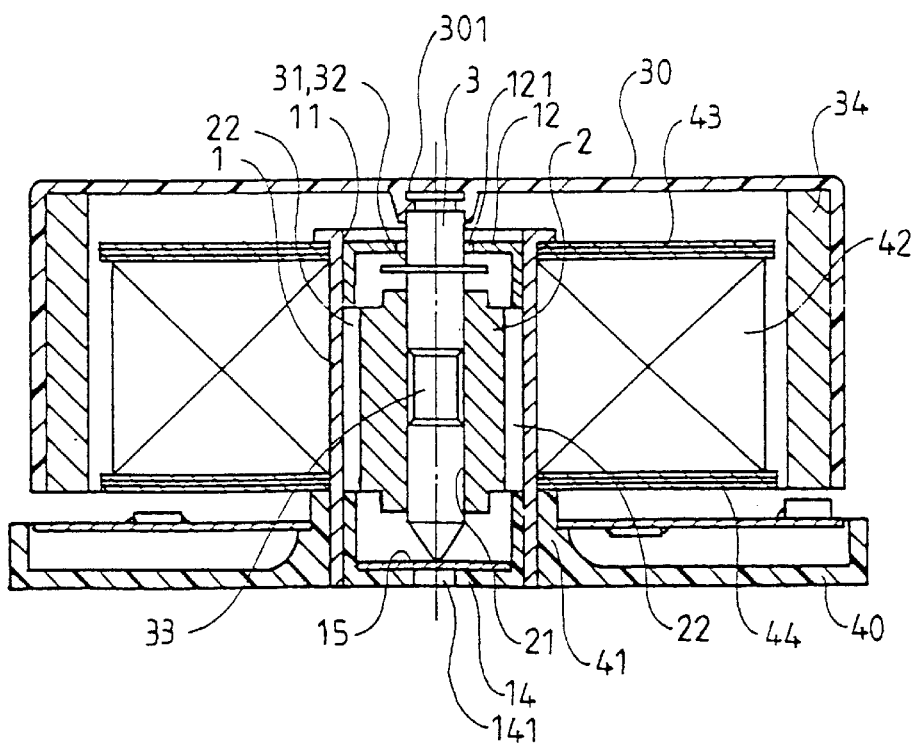
FIG. 3 is a view similar to FIG. 2, illustrating a second embodiment of the oil-impregnated bearing and rotor shaft combination in accordance with the present invention.

FIG. 3 illustrates a second embodiment of the invention, wherein the lower cap (now designated by 14) includes a through-hole or recessed portion 141 that is covered by a pad 15. The pad 15 is made of abrasion-resistant metal. Thus, when the shaft 3 of the rotor 30 is pivotally supported by the pad 15, the pad 15 provides resiliency to allow slight deformation. Accordingly, the shaft 3 of the rotor 30 also obtains certain resiliency to allow smooth and stable rotation. The friction between the lower cap 14 and the rotor shaft 3 is reduced to thereby lengthen the operating life.

According to the above description, it is appreciated that the oil-impregnated bearing 2 is mounted in the axle tube in a slip-fit manner and is positioned between the upper and lower caps such that the deformation of the inner periphery defining the central hole 21 of the oil-impregnated bearing 2 is avoided. Thus, the rotor shaft 3 and the inner periphery defining the central hole 21 of the oil-impregnated bearing 2 have a smooth contact therebetween to reduce rotational noise. In addition, upper and lower ends of the axle tube I arc respectively sealed by upper and lower caps. The retainer 32 has an outer diameter greater than an inner diameter of the opening 121 of the upper cap 12 and is located right below the opening 121 of the upper cap 12. Thus, the retainer 32 may prevent oil leakage via the opening 121 of the upper cap 12. Lubrication oil is kept in the oil-impregnated bearing, and the lubrication oil may be stored between the upper and lower caps and the bearing or accumulated in the annular groove(s) 33, thereby lengthening operating life of the bearing.

Although the invention has been explained in relation to its preferred embodiment as mentioned above, it is to be understood that many other possible modifications and variations can be made without departing from the spirit and scope of the invention. It is, therefore, contemplated that the appended claims will cover such modifications and variations that fall within the true scope of the invention.

What is claimed is:

1. An oil-impregnated bearing and rotor shaft combination comprising:

an axle tube having a hole with an upper end and a lower end, the upper end of the hole being tightly sealed by an upper cap, the upper cap having an opening, the lower end of the hole being tightly sealed by a lower cap;

an oil-impregnated bearing including a central hole, the oil-impregnated bearing being mounted in the hole of the axle tube in a slip-fit manner and restrained between the upper cap and the lower cap; and a rotor shaft including a first end adapted to be connected a center of a rotor and a second end, the rotor shaft being extended through the opening of the upper cap and the central hole of the oil-impregnated bearing with the second end of the rotor shaft pivotally supported by the lower cap.

2. The oil-impregnated bearing and rotor shaft combination as claimed in claim 1, wherein the oil-impregnated bearing includes at least one channel defined in an outer periphery thereof.

3. The oil-impregnated bearing and rotor shaft combination as claimed in claim 1, wherein the lower cap includes a pad mounted therein, the pad pivotally supporting the second end of the rotor shaft.

4. The oil-impregnated bearing and rotor shaft combination as claimed in claim 1, wherein the rotor shaft further includes a retaining groove, and a retainer engaged in the retaining groove.

5. The oil-impregnated bearing and rotor shaft combination as claimed in claim 4, wherein the outer diameter of the retainer is greater than an inner diameter of the opening of the upper cap.

6. The oil-impregnated bearing and rotor shaft combination as claimed in claim 1, wherein the lower cap includes a depression defined in an inner side thereof, and wherein the second end of the rotor shaft is conic-shaped and is pivotally supported in the depression of the lower cap.

7. The oil-impregnated bearing and rotor shaft combination as claimed in claim 1, wherein a portion of the rotor shaft that is held by the oil-impregnated bearing includes at least one annular groove.

8. The oil-impregnated bearing and rotor shaft combination as claimed in claim 1, wherein the lower cap has a through-hole, further comprising a pad covering the through-hole, the pad pivotally supporting the second end of the rotor shaft.

* * * * *